(12) United States Patent
Du

(10) Patent No.: US 6,768,977 B1
(45) Date of Patent: Jul. 27, 2004

(54) METHOD AND CIRCUIT FOR MODELING A VOICE COIL ACTUATOR OF A MASS DATA STORAGE DEVICE

(75) Inventor: Tan Du, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/451,697

(22) Filed: Nov. 30, 1999

(51) Int. Cl.[7] .................. G06F 17/50; G11B 21/08; G11B 5/55; H02K 41/60; H02P 1/00; H02P 3/00; H02P 7/00

(52) U.S. Cl. .................. 703/15; 360/264.7; 360/264.8; 360/264.9; 360/265; 318/135

(58) Field of Search .................. 703/13–15; 360/264.7, 360/264.8, 264.9, 265; 318/135

(56) References Cited

U.S. PATENT DOCUMENTS

| | | | | |
|---|---|---|---|---|
| 4,495,466 A | * | 1/1985 | Lakin .................. | 324/228 |
| 4,575,776 A | * | 3/1986 | Stephens et al. .......... | 360/78.09 |
| 4,841,393 A | * | 6/1989 | MacLeod et al. ........ | 360/98.07 |
| 5,146,122 A | * | 9/1992 | Hearn et al. .................. | 310/13 |
| 5,206,555 A | * | 4/1993 | Morris et al. .................. | 363/17 |
| 5,438,294 A | * | 8/1995 | Smith .................. | 318/254 |
| 5,465,035 A | * | 11/1995 | Scaramuzzo et al. ....... | 318/561 |
| 5,576,622 A | * | 11/1996 | Morrone et al. ............ | 324/318 |
| 5,654,840 A | * | 8/1997 | Patton et al. .................. | 703/14 |
| 5,663,873 A | * | 9/1997 | Bhagwat et al. .............. | 363/17 |
| 5,929,652 A | * | 7/1999 | Ahrenkiel .................. | 324/752 |
| 6,026,286 A | * | 2/2000 | Long .................. | 455/319 |
| 6,072,383 A | * | 6/2000 | Gallagher et al. .......... | 340/10.2 |
| 6,166,500 A | * | 12/2000 | Makaran .................. | 318/254 |
| 6,184,645 B1 | * | 2/2001 | Brito et al. .................. | 318/254 |
| 6,204,629 B1 | * | 3/2001 | Rote et al. .................. | 318/803 |
| 6,208,497 B1 | * | 3/2001 | Seale et al. .................. | 361/154 |

OTHER PUBLICATIONS

Electrical Network Theory, N. Balabanian and Theodore Bickart, 1983, ISBN 0-89874-581-0, pp. 128-129.*

"A generalized dynamic circuit model of magnetic cores for low- and high-frequency applications. II. Circuit model formulation and implementation," Hui, S.Y.R., Ahu, J.G., Ramsden, V. IEEE Transactions on Power Electronics, vol. 11, Issue 2, pp 251–259.*

"Determination of Structure and Parameters of winding equivalent circuit involving currents," Blasko, V. Industry Applications Society Annual Meeting, 1989, vol. 1, pp. 254–264.*

"A generalized dynamic circuit model of magnetic core for low- and high-frequency applications. I.Theoretical Calculation of Equivalent Core Los," Hui, S.Y.R., Ahu, J.G., Ramsden, V. IEEE Transactions on Power Electronics, vol. 11, Issue 2, pp 246–250.*

* cited by examiner

Primary Examiner—Kevin J. Teska
Assistant Examiner—Dwin M. Craig
(74) Attorney, Agent, or Firm—W. Daniel Swayze, Jr.; W. James Brady; Frederick J. Telecky, Jr.

(57) ABSTRACT

A circuit model (50) for use in analyzing a VCM circuit has a first resistor (62), a first inductor (64), a second inductor (58), and a voltage source (60), in series modeling, respectively, a VCM inductor, a winding leakage inductance of the VCM inductor, a VCM inductor resistance, and a BEMF voltage generated across the VCM inductor when the input nodes are open circuited. An input capacitor (56) interconnects the input terminals (52,54) to model an equivalent capacitance of the VCM inductor. Third and fourth inductors (32,34) and a second resistor (36) are connected in a first series loop (28) inductively coupled to the second inductor (58) to model, respectively, an inductance of the top VCM magnet plate, the leakage inductance of the top VCM magnet plate, and a resistance of the top VCM magnet plate. Fifth and sixth inductors (78,80) and a third resistor (72) are connected in a second series loop inductively coupled to the second inductor (58) to model, respectively an inductance of the bottom VCM magnet plate, the leakage inductance of the bottom VCM magnet plate, and the resistance of said top VCM magnet plate.

7 Claims, 2 Drawing Sheets

METHOD AND CIRCUIT FOR MODELING A VOICE COIL ACTUATOR OF A MASS DATA STORAGE DEVICE

BACKGROUND OF THE INVENTION

1. Field of the Invention

This invention relates to improvements in electrical model and modeling techniques for modeling electrical circuits and associated mechanical apparatuses, and more particularly to improvements in electrical models and modeling techniques for use in modeling voice coil actuator/motor (VCM) circuits and apparatuses of the type used in mass storage devices, or the like.

2. Relevant Background

A well-known hard disk drive assembly (HDA) is a typical mass data storage device of the type to which the invention pertains. Generally the HDA includes one or more rotating disks that carry a magnetic media to which data is written, and from which previously written data is read. The data is written to and read from the disk by a magnetic head or transducer that is a part of a voice coil motor (VCM) assembly, which moves the head to desired locations at which data is to be written or read.

A portion of a typical HDA 5 is shown in FIG. 1. The HDA 5 includes a VCM apparatus 10, which is shown in an exploded view in FIG. 1, in conjunction with a plurality of rotating disks 12. The VCM assembly 10 includes an arm 14 that is pivoted about a bearing point 16 to move the head or data transducer 18 radially inwardly and outwardly within the stack of data disks 12.

The outboard end of the arm 14 carries a coil 20 that is selectively energized by currents from VCM positioning circuitry 22. The outwardly extending end 24 of the arm 14 is located between two horizontal magnets 26 and 28, which are mounted to base plates 30 and 32. The base plates 30 and 32 and magnets 26 and 28 are spaced apart by spacers (not shown) to allow the arm portion 24 to freely swing between the magnets 26 and 28. Thus, as the currents from the VCM positioning circuitry 22 are applied to the coil 20, magnetic fields are altered by the current induced field of coil 20 that can precisely position the head 18 at a desired location under control of the VCM positioning circuitry 22. The plates 30 and 32, spacers, and magnets 26 and 28 are securely fastened to the base plate 34. The cover plate 35 is on the top of the base plate 32. The two plates 32 and 35 may physically touch or barely touch each other.

When the apparatus 5 is powered down, typically the head mechanism is moved to a position at which the head or transducer 18 is "parked" or "landed", generally at an outside location along the outer radius of the disk assembly 12. In order to properly move the heads to the park position, generally a driving current is applied to the coil 20 that is of sufficient magnitude to bring the head assembly to the park position. However, it will be appreciated that if the head mechanism is overdriven, the delicate head mechanism and other parts of the disk assembly may sustain damage. On other hand, if the head is underdriven, the head mechanism may not reach the park position, which may result in loss of the air bearing between the head and disk surface, which may also cause damage both to the head mechanism and to the underlying magnetic media of the disk assembly 12. As a result, it can be seen that in order to properly design the head positioning circuitry to apply correct driving currents to the voice coil, it is important to properly characterize the head assembly so that proper driving currents for various conditions can be determined.

One technique controlling the VCM is shown in U.S. patent application Ser. No. 09/388,508, filed Sep. 1, 1999 (attorney docket number TI-29097), incorporated herein by reference. One technique measuring the BEMF of the coil of the actuator used in said application Ser. No. 09/388,508 is shown in U.S. patent application Ser. No. 09/193,803, filed Nov. 17, 1998 (attorney docket number TI-26417), incorporated herein by reference.

In the past, in order to characterize the VCM assembly, a model was constructed of the electrical characteristics of the VCM. A typical model 40 of a VCM that has been used is shown in FIG. 2, to which reference is now made. The model 40 has a resistor 42, an inductor 44, and a voltage source 46 connected in series between input nodes 48 and 49. The voltage source 46 represents the back emf (BEMF), which has a value almost directly proportional to the speed of the VCM.

However, the model 40 has been found to only roughly represent the characteristics of a VCM. In particular, the model 40 may encounter deviations from the physical operations of the VCM, especially when the terminals 48 and 50 are in a floating stage for measurement of BEMF. (The BEMF is used in determining the velocity of the head, particularly during parking operations described above.) More particularly, it has been found that when the power supply voltage across the input terminals of the VCM is cut off, theoretically the VCM should settle to its BEMF rapidly as soon as the flyback current dies out. In practice, this has been found not to be the case. In fact, there has been found to almost always be a slow transient associated with the voltage across the terminals resulting in a longer settling time than would be predicted by the model 40.

What is needed, therefore, is a method and circuit to accurately model a VCM of a mass data storage device that more accurately represents the physical VCM characteristics.

SUMMARY OF THE INVENTION

Thus, according to a broad aspect of the invention, a circuit model for use in analyzing a VCM is presented. The circuit model has a first current loop having elements to model a VCM coil and magnetic field. At least one current loop is inductively coupled to the first current loop to model eddy current effects created in metallic parts of the VCM in proximity to the VCM coil.

According to another broad aspect of the invention, a circuit model for use in analyzing a VCM circuit is presented. The model has a model of a first resistor, a model of a first inductor, a model of a second Inductor and a model of a voltage source, in series between models of first and second input nodes. The model of the second inductor represents a VCM mutual inductance, the model of the first inductor represents a winding leakage inductance of the VCM inductor, the model of the first resistor represents a VCM coil resistance, and the model of a voltage source represents a BEMF voltage generated by actuator speed.

A model of an input capacitor is provided across the models of the first and second input terminals. The model of the input capacitor represents an equivalent capacitance of the VCM inductor. Models of third and fourth inductors and a model of a second resistor are provided, connected in a first series loop. The model of the third inductor is in transformer relationship to the model of the second inductor. The model of the third inductor represents an inductance of a top VCM magnetic plate, the model of the fourth inductor represents the leakage inductance of the top VCM magnetic plate, and the model of a second resistor represents a resistance of the top VCM magnetic plate. Models of fifth and sixth inductors and a model of a third resistor are connected in a second series loop. The model of the fifth inductor is in transformer relationship to the model of the second inductor and the first and second series loops are interconnected. The model of the fifth inductor represents an inductance of the bottom magnetic plate, the model of a sixth inductor represents the leakage inductance of the bottom VCM magnetic plate, and the model of the third resistor represents the resistance of the bottom VCM magnetic plate.

If needed, a fourth resistor may be provided in parallel with the model of the second inductor. The model of the fourth resistor represents the resistance in parallel with the VCM mutual inductor. Additionally, if needed, models of second and third capacitors may be respectively connected between the model of the second inductor and the first and second loops. The models of the second and third capacitors respectively represent an equivalent capacitance between the VCM coil and the top and bottom VCM magnet plates.

In accordance with another broad aspect of the invention, acts used in a method for analyzing a VCM circuit include determining eddy currents existing in a coil of a VCM, using the eddy currents to determine effective inductances that would produce the eddy currents, and including the inductances in a model of the VCM for use in analyzing the VCM.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

Figure 3:
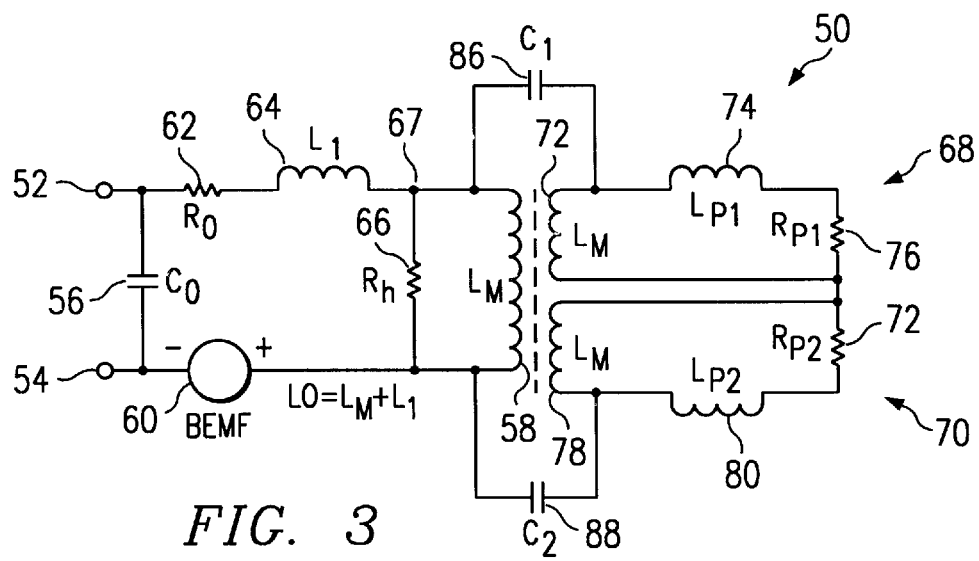
FIG. 3 is an electrical schematic diagram of a model of the VCM assembly of FIG. 1, in accordance with a preferred embodiment of the invention.

A model 50 of the voice control actuator/motor (VCM), according to a preferred embodiment of the invention, is shown in the electrical schematic diagram of FIG. 3. The model 50 takes known VCM effects into account, including eddy current effects in all the metallic parts in the neighborhood of the actuator coil, which have been unrecognized heretofore, and which, therefore, have not been modeled. The model 50, therefore, is believed to be a more accurate representation of a physical VCM assembly and its associated electrical components than models used heretofore.

Figure 1:
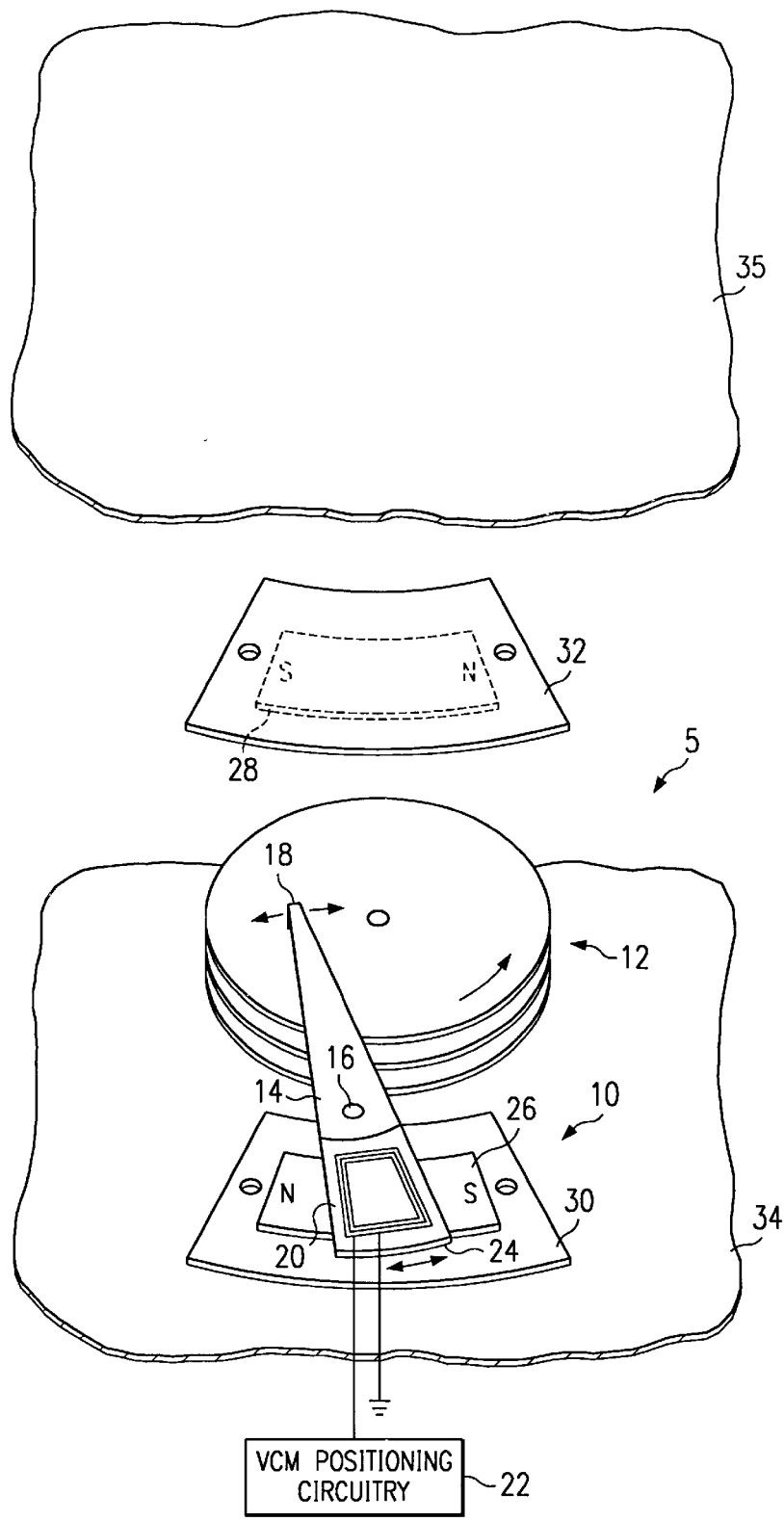
FIG. 1 is a perspective view of a portion of a mass data storage device having a VCM assembly that can be modeled using the model and techniques according to a preferred embodiment of the invention.

The model 50 includes a number of ideal model parts between the input terminals 52 and 54, which model or represent the actual VCM terminals of a physical VCM, such as that shown in FIG. 1. A capacitor 56 is connected between the input terminals 52 and 54, to represent the input capacitance of the system. The inductance of the motor coil 20 is modeled by serial inductor 64 and inductor 58 connected at point 67. The inductor 64 represents a winding leakage inductance of the VCM coil 20. The inductor 58 represents the mutual inductance between VCM coil and its metallic neighborhood including parts 26, 30, 28 and 32. The low end of inductor 58 is connected to input terminal 54 through a voltage source 60, which represents the back EMF (BEMF) of the coil 20. The BEMF, of course, is a time varying quantity; therefore, the voltage source 60 is likewise a varying voltage source that follows the BEMF waveform generated in the physical device.

A resistor 62 is connected in series between the top input terminal 52 and the left end of the inductor 64. The resistor 62 represents the resistance of the physical VCM coil 20. A resistor 66 is connected from a node 67 between the inductor 64 and inductor 58 to the bottom end of the inductor 58. The resistor 66 representing the magnetic hysteresis loss is in parallel with the VCM inductor 58, and would typically be of very high value. Consequently, in many applications, the resistor 66 may be ignored.

Figure 2:
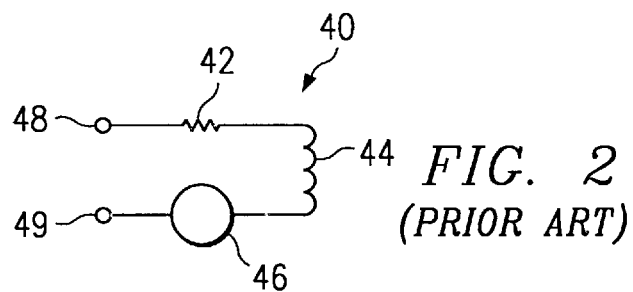
FIG. 2 is an electrical schematic diagram of a prior art model used to model the VCM assembly of FIG. 1.

I have discovered that one of the reasons that the physical VCM does not behave as predicted by the prior art model discussed above with reference to FIG. 2 is that the coil 20 of the VCM creates eddy currents in the adjacent magnets and metal parts of the VCM assembly. The eddy currents do not self-extinguish as rapidly as the fly-back current, and consequently results in the creation of a voltage across the coil when the excitation voltage has been removed. Thus, top and bottom current loops 68 and 70 are included in the model 50 to take the eddy current effects into consideration. Although the loops 68 and 70 may be combined into a single loop in some special cases, two loops are shown for purposes of discussion herein. One special case is when the ratios of the corresponding components in the two loops are close to a similar constant, or when the ratio of total inductance to resistance in one loop is much bigger to the other.

The loop 68 includes a mutual inductor 72, having an inductance equal to the value of the VCM mutual inductor 58, an inductor 74, and a resistor 76, connected in series. The inductor 72 represents the mutual inductance between VCM coil and the top VCM magnetic plate. The magnet plate includes the top VCM magnet 28 and the surrounding metallic parts, including the mounting plate 32 and top cover plate 35, into which eddy currents are induced. The inductor 74 represents the leakage inductance of the top VCM magnet plate, and the resistor 76 represents the resistance of the top VCM magnet plate.

Likewise, the bottom loop 70 includes a mutual inductor 78 having a value equal to the mutual inductance of the VCM inductor 58, and inductor 80 and a resistor 72, all connected in series. The inductor 78 represents the mutual inductance between VCM coil and the bottom VCM magnetic plate, which includes the bottom VCM magnet 26, and the surrounding metallic parts, including the mounting plate 30 and base plate 34, into which eddy currents are induced. The inductor 80 represents the leakage inductance of the bottom VCM magnet plate, and the resistor 72 represents the resistance of the bottom VCM magnet plate. The first and second loops 68 and 70 are interconnected, as shown, at one side of the inductors 72 and 78.

First and second parasitic capacitors 86 and 88 are connected between the top and bottom ends of coil 58 and the interconnection nodes of inductors 72 and 74 and inductors 78 and 80, respectively. The values of capacitors 86 and 88 may be very small. Consequently, they may be ignored in many applications.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A circuit model for use in analyzing a VCM, comprising:

a first current loop comprising elements modeling a VCM coil;

and at least one second current loop inductively coupled to said first current loop for modeling eddy current effects created in metallic parts of said VCM in proximity to said VCM coil, wherein said first current loop comprises a model of a first resistor, a model of a first inductor, a model of a second inductor and a model of a BEMF voltage source, in series between models of first and second input nodes, wherein said at least one second current loop comprises:
models of third and fourth inductors, and a model of a second resistor, connected in a first series loop of said second loop, to model eddy current effects of top metallic parts of said metallic parts, and
models of fifth and sixth inductors, and a model of a third resistor, connected in a second series loop of said second loop to model eddy current effects of bottom metallic parts of said metallic parts.

2. The circuit model of claim 1 further comprising a model of a fourth resistor in parallel with said model of said second inductor.

3. The circuit model of claim 1 further comprising models of second and third capacitors respectively connected between said model of a second inductor and said first and second loops.

4. A circuit model for use in analyzing a VCM circuit, comprising:

a model of a first resistor, a model of a first inductor, a model of a second inductor and a model of a voltage source, in series between models of first and second input nodes, wherein said model of a second inductor represents a VCM mutual inductance, said model of a first inductor represents a winding leakage inductance of said VCM coil, said model of a first resistor represents a VCM coil resistance, and said model of a voltage source represents a BEMF voltage generated by VCM speed across said VCM coil;

a model of an input capacitor across said models of said first and second input nodes, wherein said model of an input capacitor represents an equivalent capacitance of said VCM coil;

models of third and fourth inductors, and a model of a second resistor, connected in a first series loop of said circuit model, said model of a third inductor being in transformer relationship to said model of a second inductor, wherein said model of a third inductor represents an inductance of a top VCM magnet plate, said model of a fourth inductor represents a leakage inductance of said top VCM magnet plate, and said model of a second resistor represents a resistance of said top VCM magnet plate;

models of fifth and sixth inductors, and a model of a third resistor, connected in a second series loop of said circuit model, said model of a fifth inductor being in transformer relationship to said model of a second inductor, said first and second series loops being interconnected, wherein said model of a fifth inductor represents an inductance of a bottom VCM magnet plate, said model of a sixth inductor represents a leakage inductance of said bottom VCM magnet plate, and said model of a third resistor represents a resistance of said bottom VCM magnet plate.

5. The circuit model of claim 4 wherein said first and second loops further represent eddy current paths in said top and bottom VCM magnet plates.

6. The circuit model of claim 4 further comprising a model of a fourth resistor in parallel with said model of said second inductor, wherein said model of a fourth resistor represents a resistance in parallel with said VCM inductor.

7. The circuit model of claim 4 further comprising models of second and third capacitors respectively connected between said model of a second inductor and said first and second loops, said models of second and third capacitors respectively representing an equivalent capacitance between said VCM coil and said top and bottom VCM magnet plates.

* * * * *